United States Patent
Picot et al.

(10) Patent No.: US 7,076,136 B1
(45) Date of Patent: Jul. 11, 2006

(54) METHOD OF ATTACHING OPTICAL FIBERS TO INTEGRATED OPTIC CHIPS THAT EXCLUDES ALL ADHESIVE FROM THE OPTICAL PATH

(75) Inventors: John Edward Picot, Rockaway, NJ (US); Carl Edward Gaebe, Blacksburg, VA (US); Randall Brian Wilson, Warren, NJ (US); Amir Amin Hanjani, Cincinnati, OH (US)

(73) Assignee: Inplane Photonics, Inc., South Plainfield, NJ (US)

( * ) Notice: Subject to any disclaimer, the term of this patent is extended or adjusted under 35 U.S.C. 154(b) by 212 days.

(21) Appl. No.: 10/798,722

(22) Filed: Mar. 11, 2004

Related U.S. Application Data

(60) Provisional application No. 60/453,631, filed on Mar. 11, 2003.

(51) Int. Cl.
  G02B 6/00 (2006.01)
  G02B 6/36 (2006.01)
(52) U.S. Cl. .................................. 385/49; 385/129
(58) Field of Classification Search ............... 385/14, 385/15, 16, 27, 31, 39, 48, 49–50, 129–130
See application file for complete search history.

(56) References Cited

U.S. PATENT DOCUMENTS

| | | | |
|---|---|---|---|
| 5,175,781 A | 12/1992 | Hockaday et al. | 385/49 |
| 5,297,228 A | 3/1994 | Yanagawa et al. | 385/129 |
| 5,361,382 A | 11/1994 | Nakamura et al. | 385/49 |
| 5,600,745 A | 2/1997 | Wuu et al. | 385/49 |
| 5,703,973 A | 12/1997 | Mettler et al. | 385/14 |
| 5,784,509 A | 7/1998 | Yamane et al. | 385/49 |
| 6,212,320 B1 | 4/2001 | Rickman et al. | 385/49 |
| 6,304,708 B1 * | 10/2001 | Fukuyama et al. | 385/137 |
| 6,324,323 B1 | 11/2001 | Benham et al. | 385/49 |

(Continued)

FOREIGN PATENT DOCUMENTS

WO  WO 97/42534  11/1997

*Primary Examiner*—AKm Enayet Ullah
(74) *Attorney, Agent, or Firm*—Mayer Fortkort & Williams PC; Stuart H. Mayer, Esq.

(57) ABSTRACT

A method and apparatus is provided for attaching an optical fiber to a waveguide formed on a planar lightguide circuit (PLC). The method begins by securing at least one joint element to a first surface of the PLC. The joint element has a beveled surface such that a gap is formed between the joint element and the first surface of the PLC. The gap is adjacent to an end face of the waveguide. The waveguide end face extends in a plane that includes a transverse surface of the joint element to define therewith a first mating surface. The optical fiber is secured to a support member such that an end face of the optical fiber extends in a plane that includes a transverse surface of the support member to define a second mating surface therewith. The waveguide end face is aligned with the optical fiber end face. An adhesive is applied to an interface defined between the first and second mating surfaces so that the first and second mating surfaces are fixed together, whereby adhesive that would otherwise enter an optical path located between the waveguide end face and the optical fiber end face is diverted into the gap.

36 Claims, 2 Drawing Sheets

U.S. PATENT DOCUMENTS

| | | | |
|---|---|---|---|
| 6,567,590 B1 * | 5/2003 | Okada et al. | 385/49 |
| 6,647,184 B1 * | 11/2003 | Ukechi et al. | 385/47 |
| 6,873,770 B1 * | 3/2005 | Leung et al. | 385/52 |
| 2001/0010742 A1 * | 8/2001 | Nakagawa et al. | 385/84 |
| 2001/0019648 A1 * | 9/2001 | Nobuhara | 385/84 |
| 2001/0033722 A1 * | 10/2001 | Okada et al. | 385/94 |
| 2003/0081902 A1 * | 5/2003 | Blauvelt et al. | 385/50 |
| 2004/0218870 A1 * | 11/2004 | Blauvelt et al. | 385/50 |

* cited by examiner

METHOD OF ATTACHING OPTICAL FIBERS TO INTEGRATED OPTIC CHIPS THAT EXCLUDES ALL ADHESIVE FROM THE OPTICAL PATH

STATEMENT OF RELATED APPLICATION

This application claims the benefit of priority to U.S. Provisional Patent Application 60/453,631 filed Mar. 11, 2003, entitled "Method of Attaching Optical Fibers To Integrated Optic Chips That Excludes All Adhesive From The Optical Path.

FIELD OF THE INVENTION

The present invention relates generally to optical devices, and more particularly to a method for coupling optical fibers to the input and output ports of a planar lightguide circuit in a reliable and mechanically strong manner.

BACKGROUND OF THE INVENTION

Optical fibers have now replaced copper wire as the preferred medium for carrying telecommunications signals. In this context, as with copper wire, it is necessary to provide both for interconnects and for efficient terminations onto devices. With the increasing trend towards miniaturization and integration, optical components (which may include both active and passive components) are more and more being integrated on optical chips as a single module for fiber interconnection. As a consequence, the termination problem increasingly becomes one of efficiently and reliably coupling optical fibers to the waveguide channels of planar lightguide circuits (PLCs). This requires the fiber and waveguide to be arranged, both in proximity and alignment with each other, in a manner that provides for efficient (low-loss) coupling of transmission signals from the fiber to the waveguide or vice versa. More generally, multiple waveguide channels need to be respectively connected to multiple fibers such that the cross-sectional pattern of PLC waveguide channels and the arrangement of the optical fibers are aligned with each other in a manner that minimizes the coupling loss from each output.

Owing to the very small cross-sectional sizes of the light-carrying channels in both the fiber and the PLC waveguide (typical linear dimensions being in the range of 2 to 10 microns), the orientational and positional adjustments entailed in optimizing the transparency of the connection call for great precision. Conceptually, the simplest way of accomplishing it is to use a micromanipulator simply to maneuver the fiber inside a bead of epoxy resin placed between the fiber and waveguide until the optical power transmitted through the connection is maximized. When optimum coupling is achieved, the epoxy can then be UV or thermally polymerized to complete the attachment. Though simple and economical, this method suffers from several drawbacks. Because the epoxy must have low optical absorption and be index matched to the fiber and waveguide, the selection of epoxies to make the joint are very limited in number and cannot be independently optimized for strength or other mechanical and thermal properties. In addition, in applications where the fibers and waveguides carry high optical powers or optical wavelengths capable of degrading the epoxy through heating and photochemical reactions, the long-term reliability of the joint is compromised.

These shortcomings have been met by anchoring the fiber to an alignment member, which most frequently takes the form of a supporting V-shaped groove prepared either in the surface of the PLC itself or in the surface of a separately prepared 'V-block'. The general approach is to arrange the fiber in the aligning V-groove (which has been carefully prepared by etching techniques) and adjust and eventually lock its position so that the core of the fiber finely tunes to the geometric center of the corresponding waveguide. The most general alignment of a V-block with respect to a PLC channel involves six V-block variables: three translational (x,y,z) and three rotational (pitch, roll and yaw). Clearly, such a full alignment procedure can be carried out only for a fully and independently adjustable V-block. If, as is commonly the case, the V-groove is formed on the PLC itself (as in European Pat. No. 1015921 by M. R. J. Richard et al., and U.S. Pat. No. 5,175,781 by B. D. Hockaday et al., U.S. Pat. No. 5,600,745 by D-S Wuu et al., U.S. Pat. No. 5,784,509 by T. Yamane et al., U.S. Pat. No. 6,212,320 by A. G. Rickman et al., and U.S. Pat. No. 6,324,323 by V. Benham and H. Hatami-Hanza,) or the separately prepared V-chips are connected to the PLC by rods or by a plate (as in U.S. Pat. No. 5,297,228 by H. Yanagawa et al., U.S. Pat. No. 5,361,382 by S. Nakamura et al., and U.S. Pat. No. 5,703,973 by S. C. Mettler and I. A. White), then the alignment procedure is necessarily a much restricted one, usually concerning only two of the six variables: namely translational motions along the V-groove and along the axis of V-symmetry normal to the groove.

In many cases, commonly referred to as cases of 'static alignment', the accuracy of alignment for the fiber and the corresponding waveguide is completely predetermined by the design of the structure (such as the depth and angle of the V-grooves, positioning of alignment rods and locking plates, etc.) and no additional refinements are made optically prior to securing the elements. In other cases, which may termed examples of 'limited active alignment', measurements are taken of the optical transmission between the fiber and waveguide after initial alignment, and adjustments are made in order to provide a dynamic refinement of the coarser predetermined positions (see for example U.S. Pat. No. 5,175,781 by B. D. Hockaday et al. and U.S. Pat. No. 6,324,323 by V. Benham and H. Hatami-Hanza). These examples, however, like all those involving V-grooves formed on, or anchored to the PLC chip, are readily susceptible to active refinement only in the two translational directions set out above.

It is now generally accepted that active alignment procedures allowing for complete (six parameter) angular and translational adjustment produce interconnects with the lowest optical loss. In this context, a common procedure begins by polishing the mating faces of the independent V-block and PLC to a common small angle (conventionally about 8 degrees) away from the normal to the longitudinal axis of the fiber/waveguide system. This is done in order to prevent back reflections from the interface, which are generally detrimental to all optical device operations. After active alignment has been achieved, a process that typically brings the separation distance between the mating surfaces closer than 10 microns, a small quantity of adhesive (typically UV or thermal epoxy) is wicked into the gap and cured in order to secure the interconnect. As a consequence of the large area of the total mating surface (compared to the fiber and waveguide core cross-sections) the movement induced by epoxy polymerization disturbs primarily only the distance normal to the mated faces, which is the degree of freedom that least perturbs the previously minimized loss of the interconnect. Any small perturbations of the other degrees of freedom can be even further diminished by increasing the areas of the mating faces by using a wider V-block and correspondingly widening the PLC by affixing adjoining pieces to its top and bottom surfaces.

The primary drawback of the aforementioned active alignment procedure is that the adhesive that wicks into and eventually secures the joint also enters the light path between the fiber and waveguide cores and does so in a manner that is uncontrollable, irreproducible and probably non-uniform. Since no adhesive is completely transparent to light, the non-uniformity, development of strain during polymerization, lack of reproducibility, and optical degeneration of the adhesive in the presence of high temperature or high-power pump energy, are all detrimental to the general optical performance of the interconnect. An important improvement would therefore derive by excluding adhesive from the light path while maintaining the other aspects and integrity of the joint.

SUMMARY OF THE INVENTION

In accordance with the present invention, a method and apparatus is provided for attaching an optical fiber to a waveguide formed on a PLC. The method begins by securing at least one joint element to a first surface of the PLC. The joint element has a beveled surface such that a gap is formed between the joint element and the first surface of the PLC. The gap is adjacent to an end face of the waveguide. The waveguide end face extends in a plane that includes a transverse surface of the joint element to define therewith a first mating surface. The optical fiber is secured to a support member such that an end face of the optical fiber extends in a plane that includes a transverse surface of the support member to define a second mating surface therewith. The waveguide end face is aligned with the optical fiber end face. An adhesive is applied to an interface defined between the first and second mating surfaces so that the first and second mating surfaces are fixed together, whereby adhesive that would otherwise enter an optical path located between the waveguide end face and the optical fiber end face is diverted into the gap.

In accordance with one aspect of the invention the first mating surface is prepared to reducing reflections therefrom.

In accordance with another aspect of the invention, an angle is applied to the first mating surface. The angle is an acute angle defined from a normal to a longitudinal axis of the waveguide.

In accordance with another aspect of the invention, the acute angle is equal to about 8 degrees.

In accordance with another aspect of the invention, the first mating surface is lapped and polished.

In accordance with another aspect of the invention, the gap is filled with material prior to performing the lapping and polishing steps to prevent chipping of the PLC.

In accordance with another aspect of the invention, the material is removed from the gap prior to applying the adhesive.

In accordance with another aspect of the invention, the material is mounting wax.

In accordance with another aspect of the invention, the aligning step includes the step of aligning the waveguide and the optical fiber end faces in at least one translational and at least one angular direction while measuring a change in optical transmission arising over the optical path between the waveguide and the optical fiber end faces.

In accordance with another aspect of the invention, the aligning step includes the step of aligning the waveguide and the optical fiber end faces in three translational and three angular directions while measuring a change in optical transmission arising over the optical path between the waveguide and the optical fiber end faces.

In accordance with another aspect of the invention, an antireflective coating is applied to the first mating surface.

In accordance with another aspect of the invention, a second joint element is secured to a second surface of the PLC waveguide opposing the first surface. The second joint element has a beveled surface such that a second gap is formed between the second joint element and the second surface of the waveguide. The second gap is adjacent to the end face of the waveguide such that the first mating surface further includes a transverse surface of the second joint element, whereby adhesive that would otherwise enter the optical path between the waveguide end face and the optical fiber end face is diverted into the gaps.

In accordance with another aspect of the invention, the support member includes a groove in which the optical fiber is situated.

In accordance with another aspect of the invention, a PLC is provided that includes at least one waveguide formed thereon. At least one joint element is secured to a first surface of the PLC. The joint element has a beveled surface such that a gap is formed between the joint element and the first surface of the PLC. The gap is adjacent to an end face of the waveguide and the end face extends in a plane that includes a transverse surface of the joint element to define therewith a first mating surface. The PLC also includes a support member and an optical fiber secured to the support member. The optical fiber has an end face that extends in a plane that includes a transverse surface of the support member to define a second mating surface therewith. The waveguide and the optical fiber are in optical alignment with one another. An adhesive secures together the first and second mating surfaces. The adhesive is substantially absent in an optical path located between the waveguide end face and the optical fiber end face.

BRIEF DESCRIPTION OF THE DRAWING

The above objective and advantage of the present invention will become more apparent be describing in detail a preferred embodiment thereof with reference to attached drawings.

DETAILED DESCRIPTION OF THE INVENTION

Method A

Figure 2:
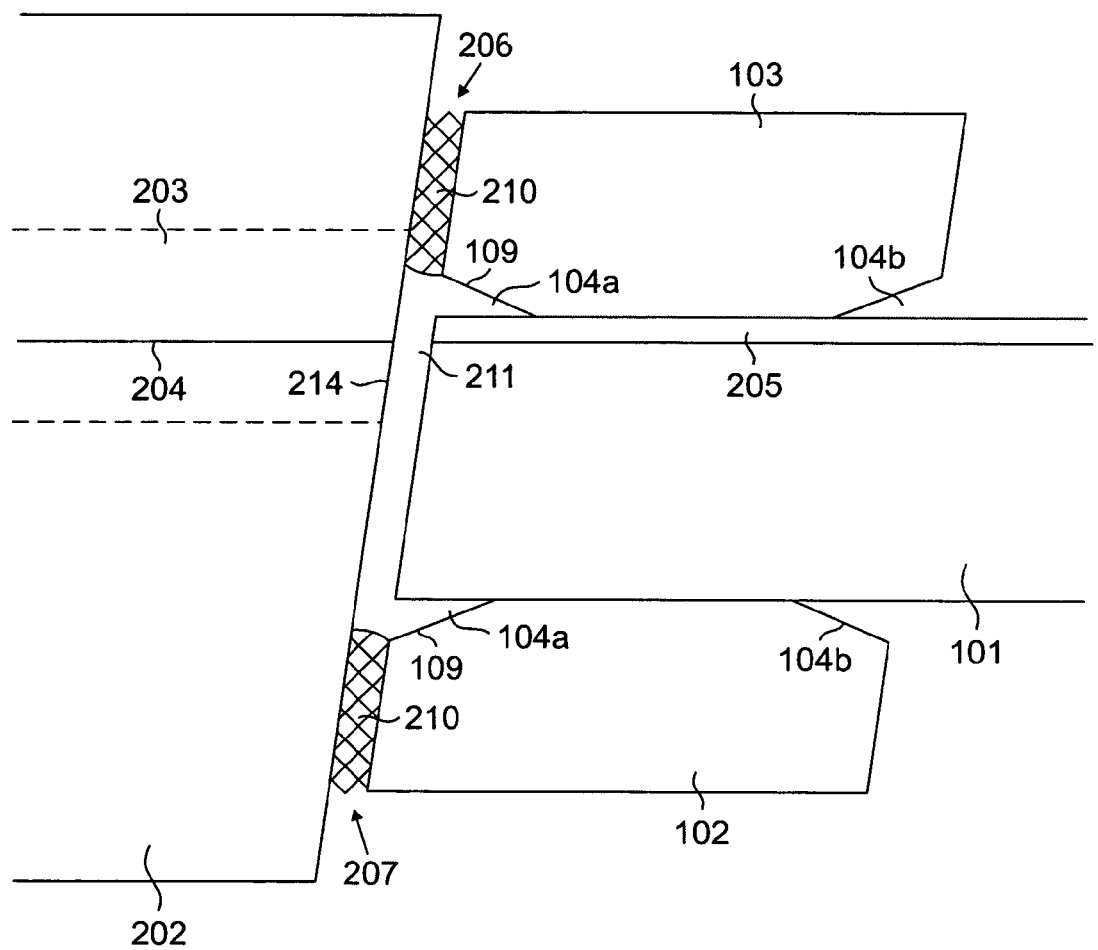
FIG. 2 is a schematic side view of the alignment of the PLC and V-block assemblies during the process of affixation.

The present invention provides a method of forming a low loss connection between an optical fiber and a waveguide formed on a planar lightguide circuit (PLC). As seen in FIG. 2, an exemplary optical fiber 203 typically comprises a commercially available, single mode fiber, having a core diameter in the range of, e.g., 2 to 10 microns. The fiber has an inner core portion 204, through which light is constrained to travel by an outer cladding portion of different refractive index than that of the core 204. Also illustrated is an end face 214 of the fiber 203, which is normally cleaved or optically polished by suitable means. The overall diameter of the optical fiber 203 is typically approximately 125 microns. Of course, the present invention is not limited to single mode optical fibers, but is more generally applicable to any optical fiber including multimode optical fibers.

FIG. 2 also shows an exemplary PLC 101 on which a waveguide 205 is formed. PLCs employ planar optical integration to manufacture waveguide circuits on silicon wafers, use processing techniques similar to those used in the silicon microelectronics industry. Such a waveguide is fabricated on a carrier substrate, which typically (although not necessarily) comprises silicon or silica. The substrate serves as a mechanical support for the otherwise fragile waveguide and it can, if desired, also play the role of the bottom portion of the cladding. In addition, it can serve as a portion of the fixture to which the optical fiber is attached so as to optically couple cores of an input/output fiber to the cores of the waveguide. The waveguide 205, which may be single mode or multimode, is typically about 5 to 10 microns in width and height for single mode. While the PLC in FIG. 2 depicts only a single waveguide 205, those of ordinary skill in the art will recognize that the present invention may be employed in connection with a PLC that includes multiple waveguides as well as different and more complex waveguide structures and systems.

Figure 1:
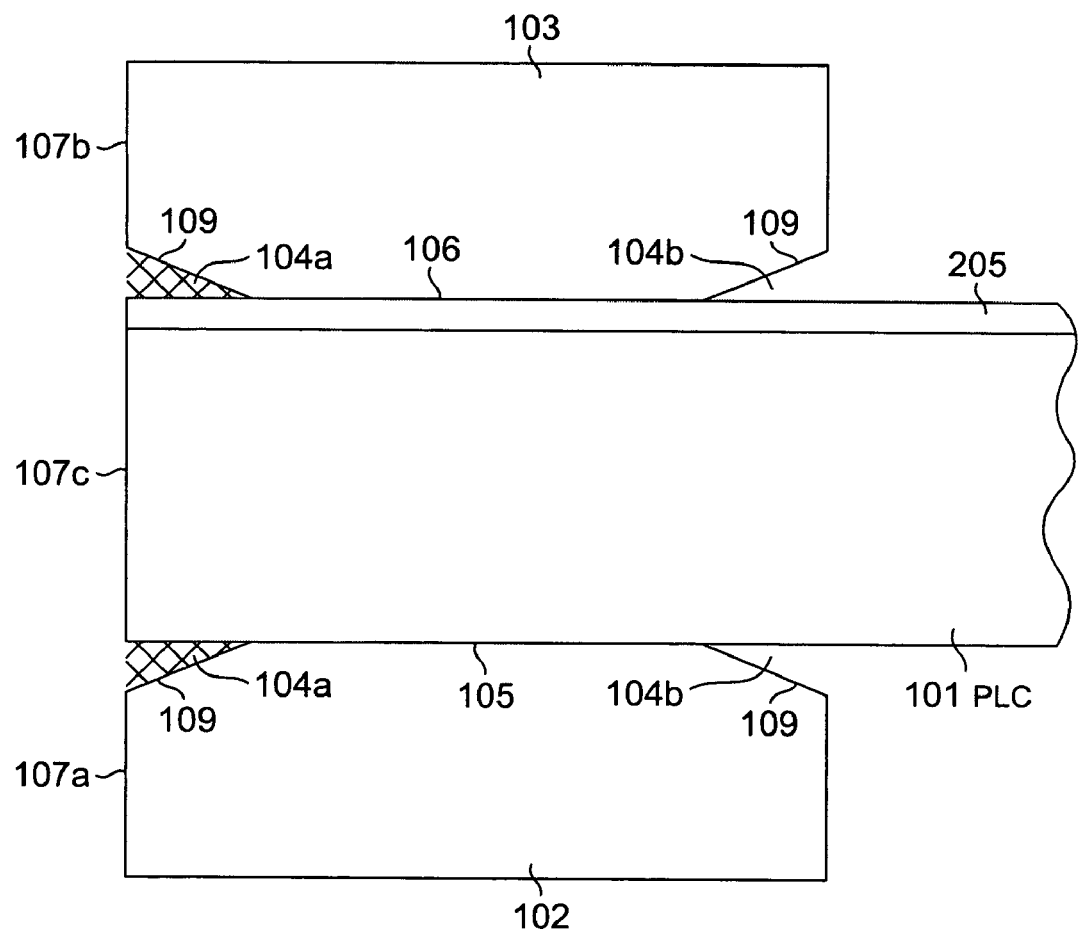
FIG. 1 is a schematic side view of a PLC with the joint piece assembly of the present invention prior to its preparation for alignment to a V-block supporting an optical fiber.

Referring to FIG. 1, the present invention begins by preparing joint pieces 102 and 103 that are subsequently attached to the lower and upper faces, respectively, of the PLC 101. The joint pieces 102 and 103 serves to facilitate the attachment of the PLC 101 to the optical fiber. Each joint piece has a surface 109 that forms an oblique angle with the surface contacting the PLC 101 In some cases the surface 109 can be parallel to interfaces 105 and 106. The surface 109, which may be beveled, chamfered, or otherwise shaped, may be provided on both ends of the joint pieces. Recess 104b allows the epoxy, needed for the attachment at interfaces 105 and 106, to be easily "wicked in". If recess 104b is not provided, it's somewhat more difficult to get the epoxy applied in a controlled way. The joint pieces 102 and 103 can in principle be made of any stiff material, although fused silica is preferred because of its transparency and strength.

After preparation, the joint pieces 102 and 103 are respectively attached to the lower and upper surfaces of the PLC 101 along interfaces 105 and 106 using epoxy, solder or other adhesive. The pieces 102 and 103 are approximately aligned to define a common end face 107 (comprising the end surfaces 107a,b of the joint pieces and end surface 107c of the PLC) and attached in a fixture (not shown) to guarantee good, but not necessarily highly precise, alignment. The surface 109 of each joint element and the surface of the PLC 101 with which it is in contact define a recess 104.

The combined assembly of FIG. 1 is then mounted into a conventional eight-degree angle polish fixture and the recess 104a between the joint pieces and the PLC at the end face 107 are filled with mounting wax 108 or any alternative material that will prevent chipping of the PLC during the lap and polishing operation to follow. The end face 107 of the combined assembly is then polished to an eight-degree angle in the usual way with a substantial portion of the regions 104a remaining after polishing. Using a combination of heat, solvents and (if needed) ultrasound, the material 108 remaining in the recess 104a is removed. After completion of this operation an antireflection (AR) coating is applied to the complete, now eight-degree-angled, end face 107.

Next, the optical fiber assembly is prepared by polishing the end face of the V-block, which contains the optical fiber or fibers to be coupled to the waveguides, to a complementary eight-degree mating angle. The end face of the V-block is also provided with an AR coating in preparation for attachment to the PLC. The overall height of the V-block assembly is approximately the same as that of the PLC assembly.

FIG. 2 depicts a side view of one groove of the V-block 202, containing optical fiber 203 having core 204. The V-block 202 and optical fiber 203 are shown in position for coupling to the waveguide 205 of PLC 101. The optical fiber 203 and waveguide 205 may be optically aligned by any technique available to those of ordinary skill in the art, including the previously discussed active alignment techniques. After being aligned, an adhesive 210 (usually, but not always, epoxy) is applied to the top and bottom edges 206 and 207 of the mating interface defined between end face 214 of the V-block 202 and the end face 107 of joint pieces 102 and 103. The adhesive 210 can spread along the mating interface but is prevented from reaching the vicinity of the optical path 211 located between the end faces of the waveguide 205 and the optical fiber 203 because the recesses 104 divert and capture any adhesive away from the end face of the waveguide 205.

Method B

Referring to FIG. 1, the second method for realizing the present invention begins by preparing joint pieces 102 and 103. The joint pieces 102 and 103 serves to facilitate the attachment of the PLC 101 to the optical fiber. Each joint piece has a surface 109 that forms an oblique angle with the surface contacting the PLC 101. The surface 109, which may be beveled, chamfered, or otherwise shaped, may be provided on both ends of the joint pieces. The joint pieces 102 and 103 can in principle be made of any stiff material, although fused silica is preferred because of its transparency and strength. In this method, the surfaces 107a and 107b are fabricated with a nominal eight-degree angle.

The PLC is prepared by mounting it into a conventional eight-degree angle polish fixture. The end face of the PLC 107c is then polished to an eight-degree angle in the usual way. After completion of this operation an antireflection (AR) coating is applied to the complete, now eight-degree-angled, end face 107c.

The optical fiber assembly is prepared by polishing the end face of the V-block, which contains the optical fiber or fibers to be coupled to the waveguides, to a complementary eight-degree mating angle. The end face of the V-block is also provided with an AR coating in preparation for attachment to the PLC. The overall height of the V-block assembly is approximately the same as that of the PLC plus the thicknesses of the two joint pieces.

Referring to FIG. 2, the second method for realizing the present invention continues by aligning the waveguide 205 and optical fiber 203. The V-block 202 and optical fiber 203 are shown in position for coupling to the waveguide 205 of PLC 101. The optical fiber 203 and waveguide 205 may be optically aligned by any technique available to those of ordinary skill in the art, including the previously discussed active alignment techniques. After being aligned, joint piece 103 is positioned such that face 107 is nearly flush with face 214 and an adhesive (usually, but not always, epoxy) is applied to the recess 104b that bonds the joint piece 103 to the PLC 101. Next, an adhesive 210 (usually, but not always, epoxy) is applied to the top edge 206 of the mating interface defined between end face 214 of the V-block 202 and the end face 107 of joint pieces 103. The adhesive 210 can spread along the mating interface but is prevented from reaching the vicinity of the optical path 211 located between the end faces of the waveguide 205 and the optical fiber 203 because the recesses 104 divert and capture any adhesive away from the end face of the waveguide 205. After curing, the assembly is turned over and an identical subsequent procedure is used to attach joint piece 102 in an identical fashion.

EXAMPLE

A typical joint piece is about 4 mm long and about 6 mm wide. The bevel angle is 16 degrees (that seemed to work best overall). With that angle, the width of the mouth of recess 104 (at the surface 107) is about 150 microns, making the surface 107a and b about 850 microns in height. So the ratio of surface 107a to the diameter of the glass portion of the fiber is 850/125. This does not include the acrylate coating of the fiber, which is about 250 microns.

What is claimed is:

1. A method for attaching an optical fiber to a waveguide formed on a PLC, said method comprising the steps of:
   securing at least one joint element to a first surface of the PLC, said joint element having a beveled surface such that a gap is formed between the joint element and the first surface of the PLC, said gap being adjacent to an end face of the waveguide, said waveguide end face extending in a plane that includes a transverse surface of the joint element to define therewith a first mating surface;
   securing the optical fiber to a support member such that an end face of the optical fiber extends in a plane that includes a transverse surface of the support member to define a second mating surface therewith;
   aligning the waveguide end face with the optical fiber end face;
   applying an adhesive to an interface defined between the first and second mating surfaces so that the first and second mating surfaces are fixed together, whereby adhesive that would otherwise enter an optical path located between the waveguide end face and the optical fiber end face is diverted into said gap.

2. The method of claim 1 further comprising the step of preparing the first mating surface for reducing reflections therefrom.

3. The method of claim 2 wherein said preparing step includes the step of applying an angle to the first mating surface, said angle being an acute angle defined from a normal to a longitudinal axis of the waveguide.

4. The method of claim 3 wherein said acute angle is equal to about 8 degrees.

5. The method of claim 3 wherein said angle applying step includes the steps of lapping and polishing the first mating surface.

6. The method of claim 5 where said angle applying step further comprises the step of filling said gap with material prior to performing the lapping and polishing steps to prevent chipping of the PLC.

7. The method of claim 6 further comprising the step of removing said material from the gap prior to applying the adhesive.

8. The method of claim 6 wherein said material is mounting wax.

9. The method of claim 1 wherein the aligning step includes the step of aligning the waveguide and the optical fiber end faces in at least one translational and at least one angular direction while measuring a change in optical transmission arising over the optical path between the waveguide and the optical fiber end faces.

10. The method of claim 1 wherein the aligning step includes the step of aligning the waveguide and the optical fiber end faces in three translational and three angular directions while measuring a change in optical transmission arising over the optical path between the waveguide and the optical fiber end faces.

11. The method of claim 1 further comprising the step of applying an antireflective coating to the first mating surface.

12. The method of claim 1 further comprising the step of securing a second joint element to a second surface of the PLC waveguide opposing said first surface, said second joint element having a beveled surface such that a second gap is formed between the second joint element and the second surface of the waveguide, said second gap being adjacent to said end face of the waveguide such that said first mating surface further includes a transverse surface of the second joint element, whereby adhesive that would otherwise enter the optical path between the waveguide end face and the optical fiber end face is diverted into said gaps.

13. The method of claim 1 wherein said support member includes a groove in which the optical fiber is situated.

14. An optical device formed in accordance with the method of claim 1.

15. An optical device, comprising:
   a PLC that includes at least one waveguide formed thereon;
   at least one joint element secured to a first surface of the PLC, said joint element having a beveled surface such that a gap is formed between the joint element and the first surface of the PLC, said gap being adjacent to an end face of the waveguide, said waveguide end face extending in a plane that includes a transverse surface of the joint element to define therewith a first mating surface;
   a support member;
   an optical fiber secured to said support member, said optical fiber having an end face that extends in a plane that includes a transverse surface of the support member to define a second mating surface therewith, said waveguide and said optical fiber being in optical alignment with one another; and
   an adhesive securing together the first and second mating surfaces, said adhesive being substantially absent in an optical path located between the waveguide end face and the optical fiber end face.

16. The optical device of claim 15 wherein said transverse surface of the joint element has a length at least about 850/125 times greater than a cross-sectional dimension of the optical fiber.

17. The optical device of claim 15 wherein the joint element is formed from fused silica.

18. The optical device of claim 15 wherein said first mating surface forms an acute angle defined from a normal to a longitudinal axis of the waveguide.

19. The optical device of claim 18 wherein said acute angle is equal to about 8 degrees.

20. The optical device of claim 15 further comprising an antireflective coating formed on the first mating surface.

21. The optical device of claim 15 further comprising a second joint element secured to a second surface of the PLC opposing said first surface, said second joint element having a beveled surface such that a second gap is formed between the second joint element and the second surface of the PLC, said second gap being adjacent to said end face of the PLC such that said first mating surface further includes a transverse surface of the second joint element, whereby adhesive that would otherwise enter the optical path between the waveguide end face and the optical fiber end face is diverted into said gaps.

22. A method for attaching an optical fiber to a waveguide formed on a PLC, said method comprising the steps of:
   securing the optical fiber to a support member such that an end face of the optical fiber extends in a plane that includes a transverse surface of the support member to define a second mating surface therewith;
   aligning an end face of the waveguide with the optical fiber end face; and
   securing at least one joint element to a first surface of the PLC, said waveguide having an end face extending in a plane that includes a transverse surface of the joint element to define therewith a first mating surface;
   applying an adhesive to an interface defined between the first and second mating surfaces so that the first and second mating surfaces are fixed together;
   conducting excess adhesive from the interface and into a reservoir formed at least in part by the joint element before said excess adhesive enters an optical path located between the waveguide end face and the optical fiber end face.

23. The method of claim 22 wherein said reservoir is formed by the joint element and said first surface of the PLC.

24. The method of claim 22 further comprising the step of preparing the first mating surface for reducing reflections therefrom.

25. The method of claim 24 wherein said preparing step includes the step of applying an angle to the first mating surface, said angle being an acute angle defined from a normal to a longitudinal axis of the waveguide.

26. The method of claim 25 wherein said acute angle is equal to about 8 degrees.

27. The method of claim 25 wherein said angle applying step includes the steps of lapping and polishing the first mating surface.

28. The method of claim 25 where said angle applying step further comprises the step of filling said gap with material prior to performing the lapping and polishing steps to prevent chipping of the PLC.

29. The method of claim 28 further comprising the step of removing said material from the gap prior to applying the adhesive.

30. The method of claim 28 wherein said material is mounting wax.

31. The method of claim 22 wherein the aligning step includes the step of aligning the waveguide and the optical fiber end faces in at least one translational and at least one angular direction while measuring a change in optical transmission arising over the optical path between the waveguide and the optical fiber end faces.

32. The method of claim 22 wherein the aligning step includes the step of aligning the waveguide and the optical fiber end faces in three translational and three angular directions while measuring a change in optical transmission arising over the optical path between the waveguide and the optical fiber end faces.

33. The method of claim 22 further comprising the step of applying an antireflective coating to the first mating surface.

34. The method of claim 22 further comprising the steps of:
   securing a second joint element to a second surface of the PLC opposing said first surface,
   applying an adhesive to said interface in a vicinity of the second joint element;
   conducting excess adhesive from the interface and into a second reservoir formed at least in part by the second joint element before said excess adhesive enters said optical path located between the waveguide end face and the optical fiber end face.

35. The method of claim 22 wherein said support member includes a groove in which the optical fiber is situated.

36. An optical device formed in accordance with the method of claim 22.

* * * * *